Figure 1:
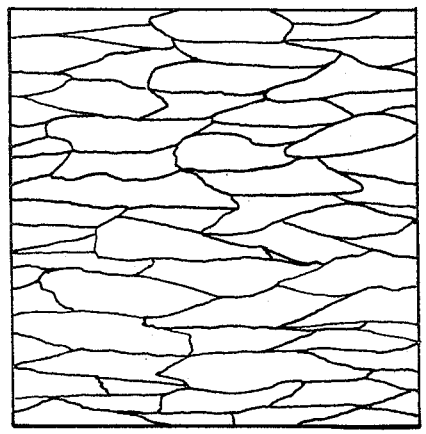

INVENTORS
Allen M. Alper
Robert N. McNally
Pellegrino Papa

BY *Clarence R. Patty Jr.*

ATTORNEY 3,332,740
MAGNESIUM OXIDE CASTING
Allen M. Alper, Corning, and Robert N. McNally and Pellegrino Papa, Horseheads, N.Y., assignors to Corhart Refractories Company, Louisville, Ky., a corporation of Delaware
Filed Mar. 16, 1964, Ser. No. 352,194
8 Claims. (Cl. 23—201)

This invention relates to the production of refractory castings of essentially pure magnesium oxide by melting the oxide and then pouring the molten mass into a mold wherein it solidifies to a monolithic structure. This type of refractory body is commonly termed "fused cast" refractory. More importantly, this invention relates to fused, monolithic, magnesium oxide refractory bodies having unique crystalline texture and pores, if present, of small size and well distributed throughout the body. The fused, monolithic, magnesia refractory bodies of this invention are especially characterized by, among other features, a combination of outstanding resistance to severe thermal shock and superior strength never possessed heretofore by known prior melted and solidified magnesia refractory masses as far as we are aware. Hence, it is the principal object of this invention to provide these fused, monolithic, magnesium oxide refractory bodies and their method of production.

All previous attempts known to us to melt and cast magnesia into useful monolithic bodies have been unsuccessful. See United States Patents 1,954,552 and 2,113,818, and A. A. Litvakovskii, "Fused Cast Refractories," English translation published by The Israel Program for Scientific Translations, Jerusalem 1961, page 40. The principal difficulties have been the very high melting point of magnesium oxide and its reactivity with carbon at such high temperature. A recent redetermination by R. N. McNally et al., J. Amer. Cer. Soc., 44 (10), 491–493 (1961), has established the melting point for magnesium oxide as $2825° \pm 20°$ C. In order to create the tremendous heat required for melting magnesium oxide, it has been a practical necessity to use the conventional technique of electric furnace melting. Conventionally, the technique has been to use a furnace with carbon or graphite electrodes. A small initial molten oxide pool is formed by carbon or graphite resistor-shorting bars placed between the electrodes. When the molten pool is of a size sufficient to conduct the electric current by itself, the electrodes are either immersed in the pool or positioned very close to the surface whereby the current passes through the molten pool between the electrodes without forming arcs of any substantial length between the electrodes and the molten pool. Unfortunately, the magnesium oxide readily reacts with the carbon or graphite electrodes under these conditions to yield a substantial volume of gaseous products primarily composed of magnesium vapor and carbon monoxide. This results in excessive loss of magnesium oxide and produces massive pores and/or large blow holes in the solidified refractory product. The higher the temperature, the more vigorous the reaction becomes thereby making the material loss and porosity problem very acute. Hence, it has been necessary to keep the temperature of the molten oxide not substantially above its melting point in order to minimize the foregoing problems. However, the unavoidable result of this is that the molten oxide is too cool to cast and the molds are incompletely filled because of the rapid solidification. Therefore, it has been common in conventional practice to allow the molten oxide to cool and solidify in situ within the mass of surrounding unmelted magnesium oxide forming a refractory lining between the molten oxide and the furnace shell.

The well known, conventional product termed "fused magnesia" is that made by solidifying molten magnesium oxide in situ in the furnace. It is shipped out of the furnace shell by pneumatic hammers or other suitable means and, most commonly, crushed into grains or granules. The granular product is then used to make refractory bodies or brick by bonding together these grains (with or without other refractory material) into the desired shapes and, usually, by firing such shaped bodies at elevated temperatures sufficient to cause sintering. Also, this grain product is used in unbonded form for such applications as insulation packing in tubular electric resistance heating elements as well as for other similar purposes.

The fused magnesia mass solidified in situ as described above is per se not capable of being manufactured into monolithic refractory bodies of desired shape without severe wastage of material. Moreover, the majority of such solidified in situ product is not capable of withstanding severe thermal shock. Such fused magnesia mass is the product of rather slow cooling and solidification. The central portion of such mass, which may include large "pipe" or void areas, generally develops into equant or equiaxed crystals that are very coarse and quite large (i.e. 0.5 cm. to greater than 2.5 cm.). It is well known that these rather large, coarse crystals readily crack along cleavage planes and, after the fused mass has been chipped out of the furnace, the vast majority of these large, equant crystals invariably are cracked. These cracks and the tendency toward cracking of the large crystals make the mass quite friable and also make it very difficult to cut out of the fused magnesia mass suitably shaped monolithic blocks. Upon cutting a chunk or piece of this fused magnesia with the diamond grinding wheel required for such manufacturing operations, this refractory piece often crumbles, spalls or disintegrates. This is the principal reason why this magnesia material fused in situ is suitable only for use in the usual grain or granular form.

In addition to the difficulties encountered with the central portion of the fused in situ product, the crystalline texture of the remaining portions of such product is overwhelmingly that of large, elongated or columnar, mutually oriented (i.e. having their longest axes generally parallel), periclase crystals formed generally perpendicular to the surfaces of the mass. This crystalline texture is extremely sensitive to, and easily fractured or disintegrated by, thermal shock.

We have now discovered a novel fused, monolithic, magnesium oxide body that possesses or exhibits, among other properties, superior strength, a capability of withstanding severe thermal shock and a capability of being cut into several monolithic pieces of desired shape without any substantial cracking or crumbling. These properties or capabilities result from providing these monolithic bodies with a crystalline texture consisting of not more than about 50 volume percent oriented, columnar, periclase crystals with the remainder being essentially equant or nonelongated, unoriented, random periclase crystals, a substantial majority (at least 75 volume percent) of these latter crystals having fine-to-medium grain sizes of not greater than 5,000 microns, as measured along the crystal axes. Preferably, the substantial majority of the equant crystals should have grain sizes in the range of 100 to 1500 microns for optimum strength and low friability properties; however, desirably good results can be obtained in the broader range of 20 to 5000 microns. As another important factor in obtaining the above-noted superior properties, porosity (when present) must be maintained generally well distributed instead of being concentrated centrally of the casting in the well-known form of "pipe" and must be in the form of small pores, of which at least 85 percent of the total number (including microscopic pores) are less than about 13 millimeters. This type of porosity appears (from microscopic observation)

to interrupt or terminate whatever few cracks develop in the medium grain size crystals and prevent their further propagation. Of course, the greater amount of grain boundaries in our fine-to-medium grain size monolithic bodies also functions similarly to the porosity as noted. The latter appears to be due to the smaller grains making it much less likely that a pile up of edge dislocations (due to thermal stresses) in one grain will be of sufficient magnitude to cause stress sufficient to develop a crack in an adjacent grain or in the grain boundary between the two grains.

Figure 2:
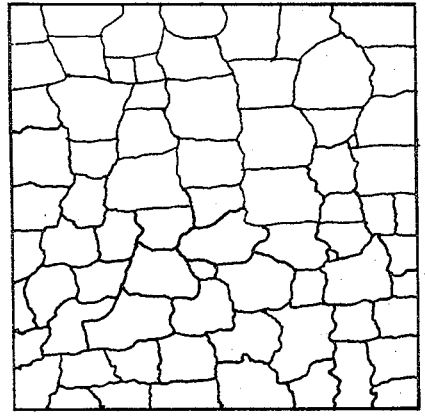

The drawing illustrates the different crystalline textures wherein:

FIGURE 1 is a graphic representation of a crystalline texture of wholly elongated, mutually oriented periclase crystals, and FIGURE 2 is a graphic representation of a crystalline texture of wholly equant or equiaxed, unoriented, random periclase crystals.

In the practice of our invention, usual commercial pure grades of magnesite can be used. The general rule of our invention is that the raw materials and the specific techniques of processing should be selected so that the resulting fused, monolithic product consists of essentially pure MgO (i.e. less than 3% by weight total impurities) and has a single crystalline periclase phase, except for very minor (less than 3 volume percent) isolated second crystalline phase crystals of a size minute relative to the periclase grain and/or partially coating the latter. Some or all of the impurities can be in solid solution within the periclase phase.

The melting of raw materials for our novel product can be carried out in conventional electric melting furnaces. We prefer a furnace comprising a water-cooled metal shell internally lined with a refractory layer defining a melting chamber and usually having three carbon or graphite electrodes connected in a three phase electrical circuit. The melting chamber is designed large enough to hold more magnesite than the amount required to be melted so that an unmelted surrounding portion of magnesite forms the refractory lining in immediate contact with the molten magnesia. This technique prevents any possible contamination from the materials of which the furnace shell is constructed and at the same time provides an additional refractory lining for safety purposes.

The following description outlines the broad essential features of the method for manufacturing our novel refractory product. A magnesia raw batch material is charged into the furnace in granular form and initial melting is effected by directly short circuiting the electrodes by means of graphite bars placed between the electrodes. Preferably, we charge only a portion of the raw batch material into the furnace, then lower the electrodes to the surface of this batch, place the short circuiting graphite bars between the electrodes and then charge the remaining portion of the raw batch material into the furnace covering the graphite bars and surrounding the lower ends of the electrodes. As soon as a pool of molten material develops of sufficient size to carry the current, the electrodes are raised, but not above the point where the arc between the electrodes and the molten pool is lost (sputters out). The graphite shorting bars can be allowed to float in the molten refractory, in which case they will burn up relatively rapidly due to the high temperature and the availability of oxygen from the surrounding air atmosphere at that point in the operation, or the bars can be withdrawn from the molten pool. Contrary to the prior conventional melting practice, the greater spacing between the electrodes and the surface of the molten pool (longer arc lengths) vastly reduces the amount of reaction between the electrodes and the magnesia batch material resulting in a correspondingly reduced volume of gaseous reaction products. This is one of the important factors that make it possible to melt and cast monolithic magnesia bodies that do not contain the detrimental massive pores or blow holes that resulted from the prior conventional techniques.

After establishing electric arcs between the molten magnesia pool and the electrodes, a very high electrical power input is continuously applied to the electrodes. Commonly this has amounted to at least 4 kilowatt-hours per pound of total melted oxide. This is maintained by continuously adjusting the spacing of the electrodes above the molten bath surface (arc length) so as to maintain the optimum distance. It seems apparent that in the past the power input was only sufficient to raise the temperature of the batch slightly above the melting point just prior to casting the material. As a result of the tendency to solidify quite rapidly, much of the molten magnesia material must have solidified in the furnace leaving insufficient liquid to fill the mold and/or the molten material cast into the mold was unable to remain molten long enough to allow for the escape of entrapped or occluded gases and vapors developed during melting and/or pouring. In contrast, our procedure involves applying a power input greatly in excess of that required merely to generate the heat to melt the batch material (i.e. specific heat up to the melting point plus the heat of fusion plus heat losses of the furnace plus some heat of vaporization). This high power input provides basically two things: rapid melting of a quantity of magnesia in excess of that required to fill the mold and superheating the molten pool substantially above the melting point. The rapid melting assists in avoiding the detrimental excessive gaseous product formation by minimizing the total melting time. Moreover, rapid melting is an economy in electric power usage by shortening the time period over which heat losses are occurring. Of course, some solidification of a magnesia cover over the molten pool is allowed to form, except in the zones of the arcs, and this cover additionally minimizes the amount of radiant heat loss.

Superheating should be substantially above the melting point of the batch material and preferably at least about 100° C. above such melting point immediately prior to casting. This superheating avoids the previously mentioned problems resulting from too rapid solidification. The higher temperature allows the molten material to remain molten somewhat longer and it is much easier to melt a quantity of material in excess of that required to fill the casting thereby being assured of a proper amount to fill the mold. As a general rule, the amount should be at least 25% by weight in excess of that required to fill the mold and preferably at least about 40% by weight in excess.

Another important factor in the manufacture of our novel refractory product is the cooling rate during and after solidification. The cooling rate should be sufficiently rapid to yield a crystalline texture in the solidified monolithic body consisting of not more than about 50 volume percent elongated, oriented, periclase crystals with the remainder being essentially equant, unoriented, periclase crystals and a substantial majority of the latter crystals having a fine-to-medium grain size not exceeding 5000 microns. Cooling too slowly will cause the detrimental formation of a large number of elongated, oriented, periclase crystals considerably exceeding 50 volume percent of the cast monolithic body. Furthermore, the slow cooling will cause the substantial majority of these remaining equant, unoriented, periclase crystals to develop grain sizes in excess of 5000 microns and as large as 2.5 centimeters or larger. Substantial cracking of these latter crystals occurs during cooling to ambient temperatures thereby rendering the cast body unsuitable as a monolithic article of manufacture. Moreover, the slower cooling rates tend to result in damage to the mold cavity surfaces due to the extreme temperatures involved and they tend to permit detrimental reactions between the mold and the cast refractory material leading to gas formation or porosity and, in some cases, contamination of the monolithic refractory product. Although water-cooled metal molds (e.g. steel) have been used for rapid cooling of castings, there is always the ever present danger of a failure in the mold resulting in the water contacting the molten or hot refractory material with dire consequences. We prefer and have obtained very successful results by constructing the internal refractory contacting portions of the molds from graphite slabs or "lumber." These graphite slabs are assembled to form the mold cavity and the assembly is then placed in a metal can. Depending upon the cooling capacity of the graphite slabs, various types of conventional insulating powder may or may not be placed between the graphite slabs and the walls of the metal can. Our experience is that the graphite slabs should be at least about ½ inch thick for castings of rather small cross section (e.g. 2" by 2") and be backed up with a conventional insulating powder layer of at least about ½ inch. The insulating powder in the latter case should not be of an extremely high insulating capacity and suitable materials in granular form are alumina, magnesia, silica and olivine. As the cross section size of the casting increases, the thickness of the graphite slab should be correspondingly increased up to about 4 inches or more for larger size castings, e.g. 6" x 13½" x 7'. For common brick-size castings ranging in cross-sectional dimensions from 3" by 4½" to 4½" by 4½", we have found that the thickness of the graphite slabs can suitably be in the range of 1" to 2".

In addition to the benefit provided by more rapid cooling of the molten oxide during and after solidification when cast into an appropriate mold, this technique has a further characteristic that contributes to forming unoriented, equant crystals. In the case of solidification in situ, cooling of the molten material is mostly unidirectional form the top surface of the molten bath because the refractory lining surrounding the sides and bottom of the bath hold a great amount of heat that has been absorbed during the melting operation and which is inherent in this conventional hearth cooling and solidifying (i.e. in situ) technique. The mold, on the other hand, provides substantially multidirectional cooling from all sides that tends to prevent or minimize the formation of elongated crystals in mutual orientation with their longest axes generally parallel.

The following description will more specifically illustrate the present invention. For the raw batch material, a commercial granulated calcined magnesite was used and it had the following typical composition by weight: 98.0% $MgO$, 1.0% $CaO$, 0.4% $SiO_2$, 0.2% $Al_2O_3$, 0.2% $Fe_2O_3$, 0.2% ignition loss. This material was charged into an electric arc melting furnace and an initial molten pool was formed as previously described. The electrodes were raised and maintained for the rest of the melting operation at a distance of approximately 1 to 2 inches above the surface of the bath. The initial heat up period in order to bring the furnace up to thermal equilibrium took about 1 hour. Thereafter, shorter melting periods of appropriate length were utilized to melt approximately 2½ times as much material as was needed to fill the mold and the font header on top of the mold. Two different size molds were used. One was designed to form a 3" by 4½" by 13½" cast brick and the other was designed to form a 4½" by 4½" by 13½" cast brick. The former used 1" thick graphite slabs and the latter used 2" thick graphite slabs. Each mold was constructed with an extra 5 inches of depth in addition to the font mold on the top for providing appropriate volume of font header for filling the casting during solidification shrinkage. After the brick were cooled, the font headers were cut off leaving the proper size brick. The average power input throughout the melting period was approximately 9.2 kilowatt-hours per pound of cast material. The apparent temperature of the molten magnesia at the time of casting was on the average 2840° C. as determined with an optical pyrometer with an average accuracy of ±15° C. However, because black body conditions were lacking (i.e. emissivity less than 1) and because the actual total amount of radiation did not reach the pyrometer due to smoke haze normally resulting in these melting operations, it was necessary to apply a temperature correction factor to the apparent temperature reading to get the true temperature. The temperature correction factor was determined to be, on an average, at least +100° C. For the smaller size brick, the melting time was about 10-15 minutes, the total cast material including the font header averaged approximately 29 pounds and the finished casting averaged 18 pounds. The comparable average melting time and weights for the larger size brick were approximately 30 minutes, 45 pounds and 25 pounds, respectively.

Examination of the transverse and longitudinal cross sections of these brick showed them to have a quenched "skin" or surface layer of equant, nonoriented, periclase crystals with grain sizes ranging from about 20 microns to 40 microns, a second zone inwardly from the "skin" of generally oriented elongated periclase crystals comprising not more than about 50 volume percent of the entire cast brick, and a central zone of generally equant, non-oriented, periclase crystals of which at least over 75 volume percent had grain sizes not greater than 5000 microns. Relatively small pores were well distributed throughout the central and oriented zones with at least 85 percent of the total number of pores consisting of pores less than 13 millimeters in average diameter. Typical apparent porosities for these bricks ranged from 5.8% to 6.1% as calculated by dividing the volume of open pores (determined by the amount of water absorbed) by the bulk volume. Typical total porosities were found to range from 6.2% to 18.4% as calculated according to the method of W. T. Kingery, "Introduction to Ceramics," published by John Wiley & Sons, New York, 1960, page 416.

Samples measuring 1" x 1" x 3" of our novel magnesia refractories and of prior art magnesia refractories were subjected to a very rigorous thermal shock test which consisted of introducing the samples into a furnace heated to 1650° C., holding the sample in the heat for 10 minutes and then removing it to cool to room temperature, and then repeating this cycle until a piece of this sample has spalled off, at which point the number of cycles are noted. The results of these tests, along with the volume percent of oriented crystals in the samples, are given in Table I wherein: samples A and B were taken from cast bricks according to our invention weighing approximately 25 pounds, samples C further illustrate our invention and were taken from a larger block weighing approximately 450 pounds, samples D and E were carefully cut from a fused mass solidified and cooled in situ and are illustrative of the fused material made by prior art techniques whereby the masses slowly cooled from the molten state, and sample F was taken from a slip cast magnesia brick fired at approximately 2000° C. and exhibiting a theoretical density of approximately 95 percent. Hence, it is readily apparent from the tabulated data that our novel fused, monolithic, magnesium oxide refractory bodies possess an outstanding resistance to severe thermal shock that is greatly superior to such property obtainable in the prior art magnesium oxide materials.

TABLE I

| Samples | Percent Orientation | Thermal Shock Cycles |
|---|---|---|
| A | <25 | 34 |
| B | ~50 | 10 |
| C | <20 | 21-25 |
| D | 75-90 | 6 |
| E | 90-100 | 1 |
| F | 0 | 3 |

The strong coherent character of our novel fused, monolithic, magnesium oxide refractory possessing the unique crystalline texture was indicated by only very minor, if any at all, crumbling or spalling during cutting of the samples and also by the superior modulus of rupture values as determined by conventional procedures at room temperature. The latter property superiority is illustrated by the tabulated data in Table II wherein the crystal size (i.e. grain size) range of various samples is based upon a substantial majority of at least 75 volume percent of the equant, unoriented crystals in the samples and samples G were specimens that were able to be carefully cut from a fused mass made according to the prior art techniques of slowly cooling in situ from the molten state.

TABLE II

| Samples | Crystal Size, microns | MOR at Room Temp., p.s.i. |
| --- | --- | --- |
| A and B | 100–650 | 4,300–8,500 |
| C | 1,000–3,200 | 6,500–12,000 |
| G | 6,000–17,000 | 600–4,700 |

It is rather evident, then, that the present invention provides strongly coherent, monolithic, fused magnesia bodies that are capable of being used per se as commercial articles of manufacture, unlike the rebonding of the prior art fused magnesia grain material resulting from the slowly cooled, friable fused magnesia masses. Moreover, it also provides such monolithic bodies capable of withstanding severe thermal shock. Furthermore, our refractory bodies possess a resistance to spalling that does not noticeably deteriorate upon being subjected to repeated temperature changes (i.e. thermal cycling). This latter factor is a result of the fact that our refractory bodies are essentially single phase periclase structures that are stable over a wide range of temperatures and undergo no detrimental phase changes with changes in temperature. Thus, problems of growth and bloating of refractory bodies that commonly occur in other known basic refractories do not occur in our refractory bodies. The inherent refractoriness and nonreactive character of magnesia makes our refractory body highly suitable for a multitude of high temperature and corrosive environment applications. Additionally, a relatively hard, abrasive character of our refractory bodies render them capable of resisting erosive action even in rapid moving, high temperature fluid environment.

It will be appreciated that the invention is not limited to the specific details shown in the examples or otherwise illustrated, except insofar as specified in the claims, and that various changes or modifications may be made within the ordinary skill of the art without departing from the spirit and scope of this invention.

We claim:
1. A fused, monolithic casting of essentially pure magnesium oxide refractory having a crystalline texture consisting of not more than about 50 volume percent elongated, oriented, periclase crystals with the remainder being essentially equant, unoriented, periclase crystals, and a substantial majority of said equant crystals having a fine-to-medium grain size not greater than 5000 microns.

2. A fused, monolithic casting of essentially pure magnesium oxide refractory having a crystalline texture consisting of not more than about 50 volume percent elongated, oriented, periclase crystals with the remainder being essentially equant, unoriented, periclase crystals, and a substantial majority of said equant crystals having a fine-to-medium grain size ranging from 100 to 1500 microns.

3. A fused, monolithic casting of essentially pure magnesium oxide refractory having a crystalline texture consisting of not more than about 25 volume percent elongated, oriented, periclase crystals with the remainder being essentially equant, unoriented, periclase crystals, and a substantial majority of said equant crystals having a fine-to-medium grain size ranging from 20 to 5000 microns.

4. A fused, monolithic casting of essentially pure magnesium oxide refractory having a crystalline texture consisting of not more than about 25 volume percent elongated, oriented, periclase crystals with the remainder being essentially equant, unoriented, periclase crystals, and a substantial majority of said equant crystals having a fine-to-medium grain size ranging from 100 to 1500 microns.

5. An essentially pure magnesium oxide, essentially single periclase phase, fused cast refractory having a crystalline texture consisting of not more than about 50 volume percent elongated, oriented crystals and with the remainder being essentially equant, unoriented crystals, a substantially majority of said equant crystals having a fine-to-medium grain size not greater than 5000 microns, and with porosity, when present, well distributed in said refractory and in a form such that at least 85 percent of the total number of pores are less than 13 millimeters in average diameter.

6. An essentially pure magnesium oxide, essentially single periclase phase, fused cast refractory having a crystalline texture consisting of not more than about 50 volume percent elongated, oriented crystals with the remainder being essentially equant, unoriented crystals, a substantial majority of said equant crystals having a fine-to-medium grain size ranging from 100 to 1500 microns, and with porosity, when present, well distributed in said refractory and in a form such that at least 85 percent of the total number of pores are less than 13 millimeters in average diameter.

7. An essentially pure magnesium oxide, essentially single periclase phase, fused cast refractory having a crystalline texture consisting of not more than about 25 volume percent elongated, oriented crystals with the remainder being essentially equant, unoriented crystals, a substantial majority of said equant crystals having a fine-to-medium grain size ranging from 20 to 5000 microns, and with porosity, when present, well distributed in said refractory and in a form such that at least 85 percent of the total number of pores are less than 13 millimeters in average diameter.

8. An essentially pure magnesium oxide, essentially single periclase phase, fused cast refractory having a crystalline texture consisting of not more than about 25 volume percent elongated, oriented crystals with the remainder being essentially equant, unoriented crystals, a substantial majority of said equant crystals having a fine-to-medium grain size ranging from 100 to 1500 microns, and with porosity, when present, well distributed in said refractory and in a form such that at least 85 percent of the total number of pores are less than 13 millimeters in average diameter.

References Cited

UNITED STATES PATENTS

| | | | |
| --- | --- | --- | --- |
| 785,841 | 3/1905 | Turner | 23—201 X |
| 1,199,042 | 9/1916 | Allen | 264—332 |
| 1,352,388 | 9/1920 | Saunders | 23—201 X |
| 1,954,552 | 4/1934 | Williams et al. | 106—58 |

FOREIGN PATENTS

| | | |
| --- | --- | --- |
| 538,468 | 3/1957 | Canada. |

OSCAR R. VERTIZ, *Primary Examiner.*

G. T. OZAKI, *Assistant Examiner.*